Aug. 27, 1968  E. W. ALEXANDER  3,398,742

BED TRACTION UNIT

Filed Sept. 27, 1965

INVENTOR.
Edwin W. Alexander
BY William Cleland
Attorney 3,398,742
BED TRACTION UNIT
Edwin W. Alexander, 842 Hollywood Circle,
Cuyahoga Falls, Ohio 44221
Filed Sept. 27, 1965, Ser. No. 490,538
6 Claims. (Cl. 128—75)

ABSTRACT OF THE DISCLOSURE

Bed traction device comprises segmental frame formed of continuous elongated rigid material to provide lower loop-shaped, horizontal base portion, laterally spaced vertical side portions in a vertical plane and connected to sides of base portion by reversely looped portions presented outwardly of vertical plane, and an upwardly presented loop portion defining cross-piece between the vertical side portions. Frame freely slidable as unit on floor, supportingly to engage vertical side portions with end board of bed against tilting of frame due to pull of traction cable on pulley means attached to cross-piece.

---

This invention relates to orthopedic traction equipment, and in particular relates to a traction unit for use in co-operation with a bed having a patient thereon.

Heretofore, traction units of the type described have been generally unsatisfactory because they were bulky and heavy and, therefore, expensive to produce. These objectionable features presented serious problems with reference to shipping and storage of the units. Moreover, such prior art devices were generally limited to use for only one or other of the several types of traction treatments.

One object of the present invention is to provide a traction device of the character described which can readily be used for a number of different types of traction treatments.

Another object of the invention is to provide a traction unit of the character described which is simple and economical to manufacture, and is easily reduced to substantially flat compact size which facilitates shipping and storage of the units.

Another object of the invention is to produce a traction unit of the character described which in cooperation with a bed will retain a firmly fixed position on a floor under normal conditions of use for traction treatments.

These and other objects of the invention will be manifest from the following brief description and the accompanying drawings.

Figure 2:
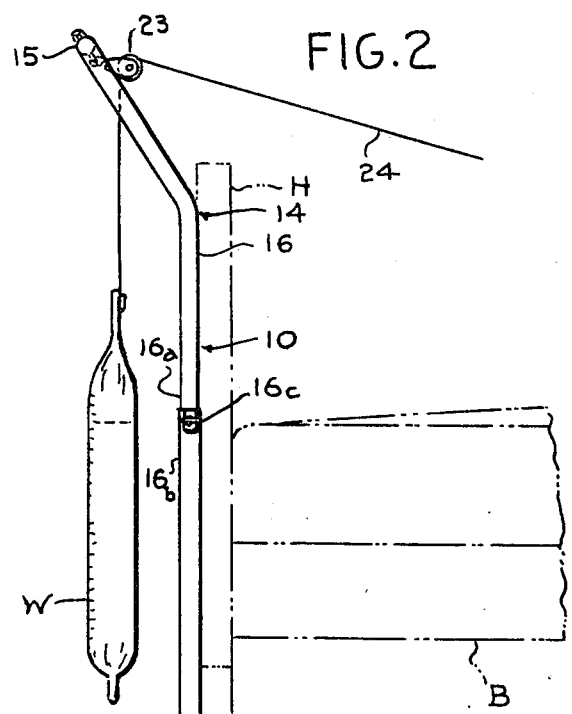
FIGURE 2 is an enlarged side elevation thereof, parts other than the traction unit again being shown in chain-dotted lines.

Referring to the drawings generally, the numeral 10 designates a bed traction frame, suitably formed from tubular rigid stock, such as aluminum or steel, as a continuous, rigid element. The rigid element includes a horizontal U-shaped, lower loop 11 having open and closed ends 12 and 13, respectively, and a vertical upper U-shaped loop 14, including a straight cross-piece 15, and laterally spaced side portions 16, 16, which are connected to corresponding horizontal side portions 17, 17 of the lower loop by portions 18 of the continuous frame which are reversely bent forwardly in vertical planes, so that at least the lower portions of sides 16 extend in a laterally extending vertical plane normal to the horizontal plane of the lower loop 11. When the latter is supported flatly on a floor F (FIGURE 2), it is apparent that said vertical plane is outwardly offset with respect to closed end 12, and somewhat centrally of the floor-engaging portion of the U-shaped lower loop or base 11. A substantial extent of the closed end of the upper loop 14 may be bent outwardly of the frame to present said cross-piece 15 in outwardly offset relation to said vertical plane and vertical parts of the side portions 16, as best shown in FIGURE 2, and thereby to over-lie the projecting reversely-bent portions 18 for purposes to be described.

For facilitating height adjustments of the cross-piece 15, upper portions 16a, 16a of the straight sides 16 may be proportioned for telescopic reception in lower portions 16b, 16b. Accordingly, thumb screws, threaded in bosses 16c, 16c affixed on said lower portions, are operable into releasable locking engagement with the upper portions 16a to lock the upper and lower portions together in selected positions of extension or retraction, according to height requirements of the cross-piece 15.

Means may be provided for attachment of two pulleys 22, 22 to cross-piece 15, or single central pulley 23 over which weighted cables 24 extend to a suitable traction harness on a patient in bed B. Vertical adjustment of the upper loop 14 is made to allow the cable to clear the top of the head or end board H. The offset arrangement of the cross-piece 15 on the upper loop allows a weight W, such as a sand or water-filled plastic bag, to be free and clear of said head board.

The lower loop 11 may have telescopic connections 25, 25 on the order of that of the upper connections at 16a and 16b, so that the frame can be easily dismantled into four major parts, which parts may be packaged within a small, shallow box, not much bigger than the largest dismantled part, and within which box it is also possible to include the traction harness, cables, and weights.

Figure 1:
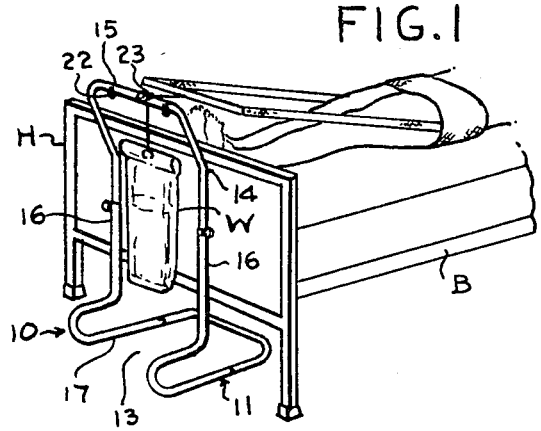
FIGURE 1 is a perspective view of a bed traction unit embodying the features of the invention, in cooperation with a bed.

In use of the improved traction unit, in assembled condition it is supported upright on floor F on its base loop 11, and moved toward engagement of the straight sides 16 of the frame 10 with the head or end board H of bed B, as best shown in FIGURE 2, wherein a substantial extent of the base loop 11 extends under the bed, the vertical loop portions 18 extend outwardly of the bed, and the cross-piece 15 is presented above and outwardly of the top of head board H. One or two cables 24 may then be trained over the corresponding pulley or pulleys 22 or 23 for tensional attachment to a harness on the patient, against the weight W suspended on the other end of the cable. Thus, the substantial flat engagement of base 11 on the floor F, coupled with inward flatwise engagement of the vertical sides 16 with the head board H, holds the unitary frame firmly in position so that in normal use of the unit for various traction treatments the frame 10 will not be tilted or twisted out of its solid position against the head board H. Due to the free and unobstructed nature of the frame 10, particularly inwardly of the straight sides 16, between said sides 16, and upwardly of the base 11, the unit is easily positioned for use as described above, and as shown in FIGURES 1 and 2, so as to avoid interference with projecting devices of the types found on hospital beds, for example.

Modifications of the invention may be resorted to without departing from the spirit of the invention or the scope of the appended claims.

What is claimed is:

1. A bed traction device for use with at least one traction harness on a weighted pulley cable, comprising a frame unit of continuous, elongated rigid material, including: a lower loop-shaped base portion substantially in a horizontal plane having an inward closed end, and laterally spaced sides, for firm flatwise support on a floor;

laterally spaced, vertical sides portions extending substantially in a vertical plane normal to the plane of said loop-shaped base portion, and connected to said laterally spaced sides thereof by reversely looped portions of the continuous rigid material extending outwardly of said vertical plane; and the upper ends of said vertical side portions terminating in an upwardly presented loop portion defining a cross-piece; the space inwardly within the included angle between said horizontal plane of the base and said vertical plane thereby being substantially free and unobstructed above said base portion, whereby the frame as a unit is freely slidable along the floor on said base portion thereof into a position in which said vertical side portions are in firm flatwise engagement with an end board of the bed and in which said base loop portion is inwardly of the end board, thereby to support the frame unit against tilting movement with respect to said end board with application of pressure to said cross-piece tending to urge the unit inwardly against the end board; said cross-piece being provided with at least one pulley attachment means thereon for connection to said weighted pulley cable thereto.

2. A traction unit as in claim 1, wherein said reversely looped portions are substantially in planes vertically aligned with the respective laterally opposite said vertical side portions of said frame.

3. A traction unit as in claim 2, wherein said upwardly presented loop has a bend therein presenting said cross-piece in outwardly offset relation to said vertical plane.

4. A traction unit as in claim 3, wherein said rigid material is tubular stock and said frame unit is composed of telescopically connected segments.

5. A traction unit as in claim 1, wherein portions of said upper and lower loop portions are releasably telescopically connected within the frame unit.

6. A traction unit as in claim 3, wherein said rigid material is tubular stock and said frame unit is composed of releasably telescopically jointed segments, and means is provided for telescopically joining segments together.

References Cited
UNITED STATES PATENTS

| | | | |
|---|---|---|---|
| 2,796,061 | 6/1957 | Miller | 128—84 |
| 3,068,859 | 12/1962 | Treutelaar | 128—75 |

L. W. TRAPP, *Primary Examiner.*

J. W. HINEY, *Assistant Examiner.*